Patented Sept. 26, 1922.

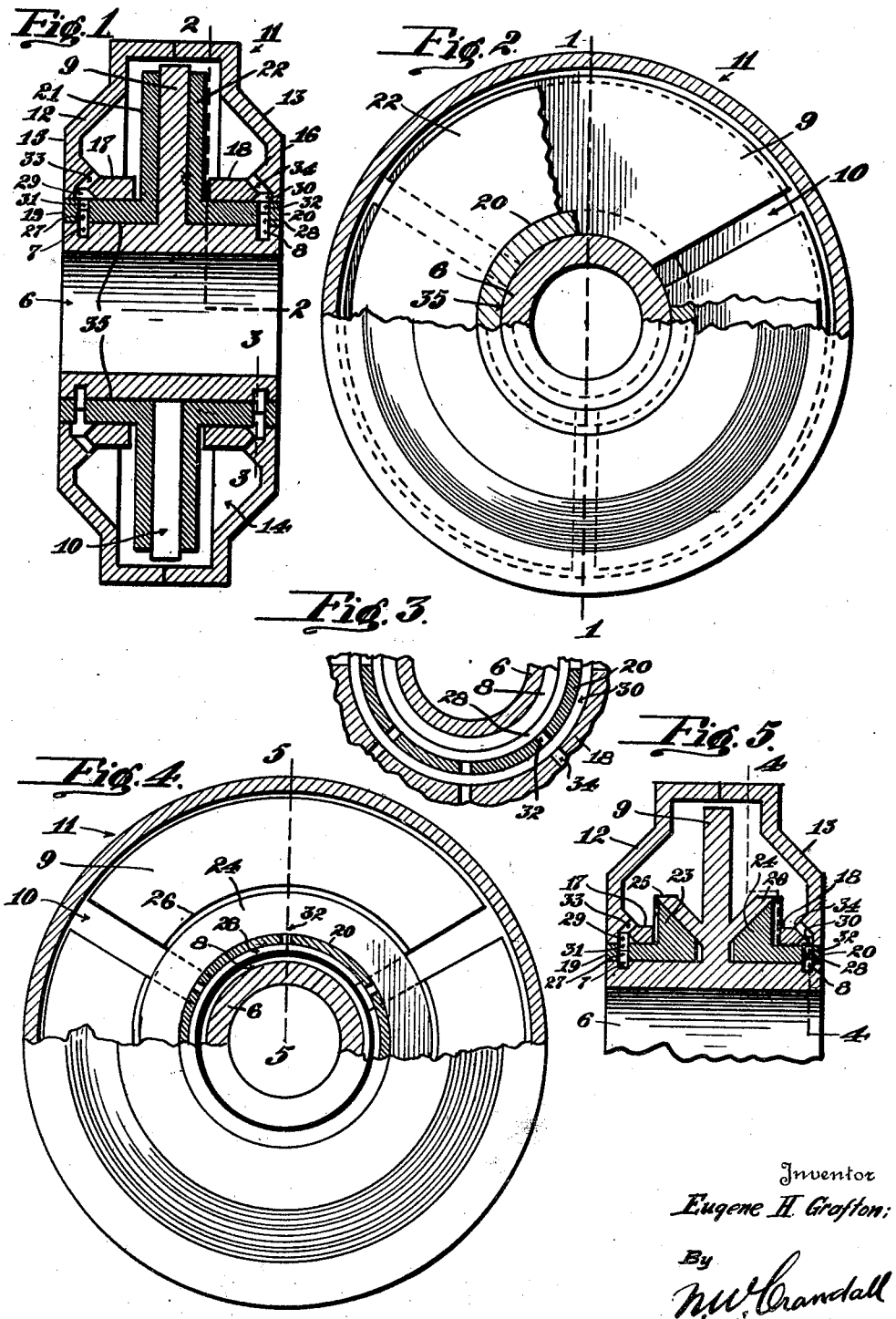

1,430,074

UNITED STATES PATENT OFFICE.

EUGENE H. GRAFTON, OF LOS ANGELES, CALIFORNIA.

BEARING.

Application filed November 18, 1920. Serial No. 424,973.

*To all whom it may concern:*

Be it known that I, EUGENE H. GRAFTON, a citizen of the United States, residing at Los Angeles, in the county of Los Angeles and State of California, have invented new and useful Improvements in Bearings, of which the following is a specification.

This invention relates to a bearing, and particularly pertains to a journal for wheel spindles and the like.

An object of this invention is to provide a construction in a bearing or journal whereby an effective distribution of lubricant to the wearing surfaces will be obtained on rotation of the shaft or spindle mounted therein.

Another object is to provide a self-oiling bearing so formed and constructed as to enable ready assemblage of the parts.

A further object is to provide a bearing which is especially adapted for use on trolley wheels and the like which by reason of their high speed of travel and severe service require thorough lubrication and because of their comparatively small size are ordinarily difficult to maintain properly lubricated.

Other objects will appear hereinafter.

The invention is illustrated in the accompanying drawings, in which:

Figure 1 is a view in vertical section of the bearing and its mounting as seen on the line 1—1 of Figure 2.

Figure 2 is a view in section and elevation as seen on the line 2—2 of Figure 1 with parts broken away.

Figure 3 is a detail section as seen on the line 3—3 of Figure 1.

Figure 4 is a view in elevation with parts broken away on the line 4—4 of Figure 5 showing a modified form of the invention.

Figure 5 is a detail in section as seen on the line 5—5 of Figure 4.

More specifically, 6 indicates an inner cylindrical member formed with spaced peripheral grooves 7 and 8 and having a circumferentially extending web 9 projecting outwardly therefrom intermediate the grooves 7 and 8; the web 9 being formed with radial open slots 10, the inner ends of which terminate flush with the circumferential face of the member 6.

Encompassing the member 6 is a housing 11 comprising a pair of side members 12 and 13 which are connected together around the inner member to form a chamber 14 adapted to receive a lubricant. The members 12 and 13 are formed with end walls 15 and 16 having inturned annular hub flanges 17 and 18 which encircle the inner member 6 and are spaced therefrom, and mounted on the inner faces of the flanges 17 and 18 are annular bushings 19 and 20 which are tight on the flange 17 and 18 and are turnable on the inner member 6; the bushings 19 and 20 extending throughout the outer bearing surface of the member 6 from points spaced from the outer walls of the channels 7 and 8 to a point adjacent the web 9. Annular flanges 21 and 22 are formed on the inner end of the bushing 19 and 20 and bear against the opposite sides of the web 9, which flanges may be straight and parallel with the web 9, as shown in Figure 1 or may be tapered as indicated at 23 and 24 in Figure 5 and bear against corresponding tapered flanges 25 and 26 formed on the opposite sides of the web 9.

Formed on the inner peripheries of the bushings 19 and 20 are annular grooves 27 and 28 which register with the grooves 7 and 8 on the inner member 6 and formed on the inner peripheries of the flanges 17 and 18 are channels 29 and 30 which communicate with the channels 19 and 20 in the bushings through apertures 31 and 32 formed in the latter. Communication is effected between the channels 29 and 30 and the interior of the housing 11 by openings 33 and 34 in the flanges 17 and 18.

In the operation of the invention, the inner and outer members 6 and 11 are rotated relative to each other, either the member 6 or the member 11 being mounted stationary. In event the outer member 11 is stationary and the inner member turned, the channels 10 in the web 9 will pick up the lubricant contained in the lower portion of the casing and as the channels move over the upper portion of the inner member will deliver the lubricant to the joint 35 between the bushings 19 and 20 and the member 6. The lubricant will flow outwardly along the joint 35 into the registering grooves 7—27 and 8—28 and be thrown outwardly by centrifugal force on rotation of the bushing through the apertures 31 and 32 into the channels 29 and 30 and thence through the openings 33 and 34 back into the interior of the housing. In event the housing is rotated and the inner member 6 is held stationary the lubricant will be caused to flow in a reverse direction, that is, entering the openings 33 and 34, passing to channels 29 and 30 thence through the apertures 31 and 32 into the registering grooves 7—27 and 8—28 and then delivered along the joint 35 to the slots 10. The lubricant will also be fed to the bearing surfaces between the faces of the bushing flanges and the web 9.

I claim:

1. In a bearing, an inner cylindrical member having a peripheral web formed with radial slots and formed with circumferential grooves on opposite sides of the web, an outer housing member having inturned annular flanges encircling the inner member, said inturned flanges having inner peripheral grooves arranged opposite the grooves on the inner member, and a pair of annular bushing members interposed between the inner member and the inturned flanges of the outer member having inner annular channels registering with the grooves on the inner member and formed with apertures leading from the channels and communicating with the grooves on the outer member.

2. In a bearing, an inner cylindrical member having a peripheral web formed with radial slots and formed with circumferential groves on opposite sides of the web, an outer housing member having inturned annular flanges encircling the inner member, said inturned flanges having inner peripheral grooves arranged opposite the grooves on the inner member, and a pair of annular bushing members interposed between the inner member and the inturned flanges of the outer member having inner annular channels registering with the grooves on the inner member and formed with apertures leading from the channels and communicating with the grooves on the outer member, said bushing members formed with end flanges abutting against the opposite sides of the web on the inner member and extending between said web and the ends of the inturned flanges of the outer member.

3. A bearing comprising an inner cylindrical member formed with spaced circumferential grooves, a peripheral web on said inner member arranged between the grooves and formed with radial slots, a pair of bushing members encircling the inner member on opposite sides of the web having end portions abutting against said web, the radial slots in said web terminating at their inner ends at the peripheral joint between the bushings and the inner member, and an outer housing member encompassing the inner member forming a lubricant receiving chamber to feed lubricant to the radial slots of the inner member whereby the lubricant may be fed to the joint between the bushings and the inner member and to the grooves in the latter, and means for delivering lubricant from said grooves back into the chamber.

4. In a bearing, an inner cylindrical member, having spaced peripheral grooves, a web projecting circumferentially from said inner member betwen the grooves formed with open radial slots the inner ends of which terminate at the surface of the cylindrical face of the inner member, annular bushings encircling said inner member in slidable contact therewith having end flanges abutting against the opposite sides of the web on the inner member, an outer housing member encompassing the inner member having inturned annular flanges encircling and engaging the bushings, said inturned flanges being formed with annular channels on their inner periphery and having apertures leading from said channels to the interior of the housing member, and communications between the channels on the outer member and the grooves on the inner member through the bushings.

5. A bearing comprising a housing enclosing a chamber to form a lubricant receptacle, said housing having end walls formed with opposed inturned hub flanges, a bushing lining each of said hub flanges, a cylindrical member mounted in said bushings and turnable relative thereto, a peripheral web on said cylindrical member formed with radial slots; whereby rotation of the cylindrical member relative to the bushings will deliver lubricant from the housing to the joint between the bushings and the cylindrical member at a point adjacent to the web, an end of each bushing bearing on the web and extending over the slots in the latter.

EUGENE H. GRAFTON.